April 25, 1939.  J. P. SEAHOLM  2,155,739

SCRAPER MOUNTING FOR DISK PLOWS

Filed March 28, 1938

INVENTOR.
JOHN P. SEAHOLM
BY Andrew E. Carlsen
ATTORNEY.

Patented Apr. 25, 1939

2,155,739

UNITED STATES PATENT OFFICE 2,155,739

SCRAPER MOUNTING FOR DISK PLOWS

John P. Seaholm, Moline, Ill., assignor to Minneapolis-Moline Power Implement Company, Minneapolis, Minn., a corporation of Delaware Application March 28, 1938, Serial No. 198,432

4 Claims. (Cl. 97—223)

This invention relates to improvements in scraper mountings for disk plows.

In the type of implement here in mind, the ground working disks are arranged in echelon and are supported along a horizontal beam which is wheel supported and is drawn over the ground by the tractive force, whatever it may be, so that the disks enter and work the ground. In order, then, to free the disks of any soil or other matter which might cling thereto, it is necessary to provide scraping devices which are extended from the beam to stand in scraping relation to the disks as they rotate. Hitherto considerable difficulty has been experienced in so mounting the scrapers that they would maintain their proper relative position with respect to the disks and the scrapers have had a tendency to work away from the disks so that a considerable quantity of soil would adhere to the disks and often cause choking of the plow.

With the above facts in view, it is the primary object of this invention to provide a scraper mounting of such nature that the scraper will be rigidly and positively supported in its proper position relative to the disk. Another object is to provide a scraper mounting which may be readily applied to the plow beam without drilling or alteration thereof and which is of a nature permitting the convenient initial adjustment of the scraper to the best position along the beam and with respect to the disk. A further object is to provide a scraper mounting which provides a wide bearing surface along the plow beam and in which a clamping effect is exerted around all sides of the beam to thus increase the effectiveness and rigidity of the mounting. A still further object is to provide an upward means for connecting the scraper itself to the mounting which is associated with the plow beam, and of such construction as to permit of adjustment of the scraper in both horizontal and vertical planes to thus facilitate proper positioning of the scraper relative to the disk.

The foregoing and other objects of my invention will be made apparent in the course of the following detailed specification, reference being had to the accompanying drawing wherein.

Figure 1:
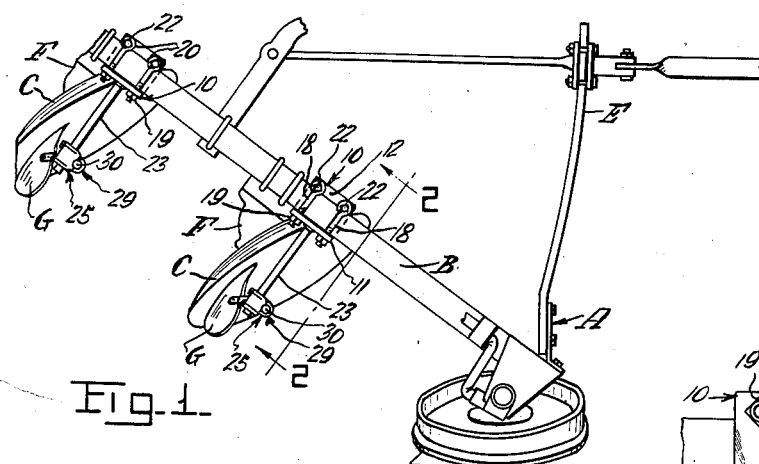
Figure 1 is a fragmental plan view of the frontal portion of a disk plow, showing my scraper mounting applied thereto.
Figure 5:
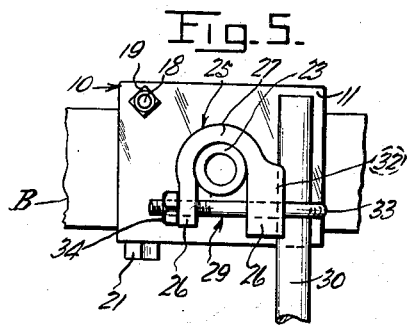
Figure 5 is a further enlarged rear elevation of the scraper mounting, viewed from the rear end of the mounting arm and showing the clamping element used for securing the scraper to the said arm.

Referring now with more particularity to the drawing, the reference character A designates generally the plow having the angularly extended beam B and disks C supported in echelon thereon. The beam B is wheel supported (only the frontal wheel D is here shown) and the plow is drawn over the field by draft applied to the hitch E. The disks C then rotate on their standards or mountings F in such manner as to penetrate and work the ground. In order to scrape the concaved faces of the disks C and prevent the accumulation of soil and other matter thereon, the scrapers or scraper blades G are provided and it is for the purpose of supporting these scrapers in proper relation to the disks that I have provided my mountings which will now be described.

Figure 2:
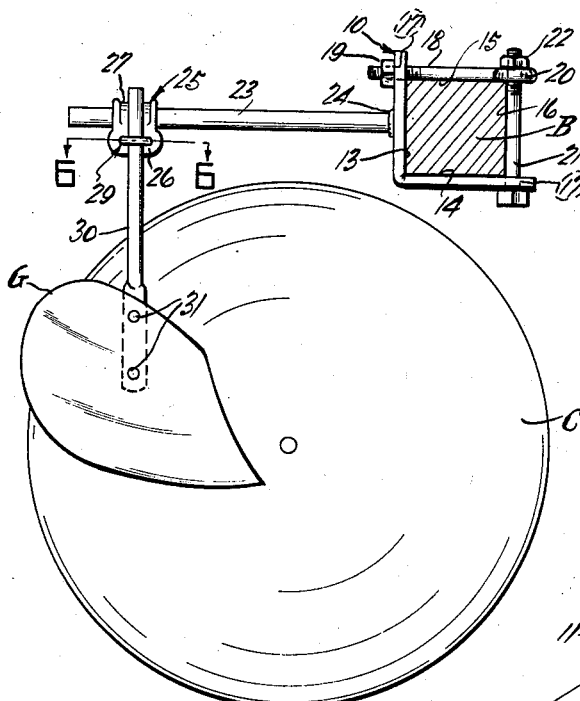
Figure 2 is an enlarged vertical cross sectional view, taken along the line 2—2 in Figure 1, and showing the plow beam, a disk and the scraper and its mounting.
Figure 6:
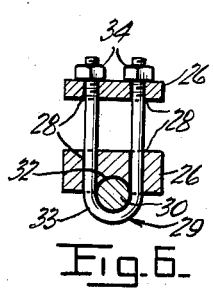
Figure 3:
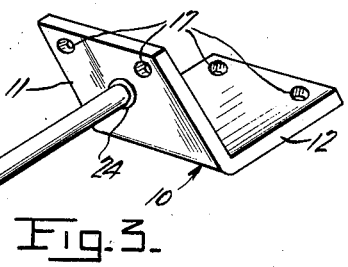
Figure 3 is a perspective view of the scraper mounting bracket and arm, removed from the plow.
Figure 4:
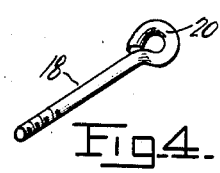
Figure 4 is a perspective view of one of the eye bolts used in clamping the mounting bracket to the plow beam.

It will be noted that the plow beam B is of substantially square cross section (Figure 2) and it may be stated at this point that these beams are most generally of this shape. My invention, however, may be applied to a beam of any rectilinear cross section, whether it be square or rectangular, and a sufficient range of adjustment may be provided to fit a beam of any usual dimensions.

For each of the disks C, I provide a mounting bracket 10 of wide V-shaped form made up of two plates or webs 11 and 12 joined along one edge to extend at right angles to each other and thus to fit nicely over the rear lower corner of the beam B and against the rear and lower faces 13 and 14 thereof. The bracket may be cut in lengths from angle stock, formed up from flat blanks or otherwise fabricated and in any event, the length of the bracket is such as to embrace a substantial length of the beam B and the width of the plates 11 and 12 is such that the free edges thereof will project some distance above and forwardly of the upper and rear faces 15 and 16 of the beam as clearly shown. These free edge portions of the plates 11 and 12 are provided each with two apertures designated generally at 17 and located in spaced relation and in such position that they will fall just clear of the beam 13 when the bracket is mounted thereon.

With the bracket 10 thus placed on the beam

B, eye bolts 18 are extended at their threaded ends through the apertures 17 in the rear or vertical plate 11 and are provided with nuts 19 rearwardly of the plate. The eye bolts then lie flat across the upper face 15 of the beam B and the eyes 20 are located just forwardly of the beam. Clamp bolts 21 are then extended upwardly through the apertures 17 in the lower or horizontal web 12 and their threaded ends are extended through the eyes 20 with nuts 22 above these eyes. Now, by drawing the nuts 19 and 22 tight, it will be evident that both plates 11 and 12 of the mounting bracket 10 may be clamped tightly against the rear and lower faces 13 and 14 of the beam B and the bracket will thus be rigidly anchored on the beam. During this action the eye bolts 18 and clamp bolts 21 engage the upper and frontal faces 15 and 16 of the beam B and mutually support and form bearings for each other to effectively clamp the bracket in place.

In lieu of the apertures 17 in the mounting bracket 10, slots may be provided and the eye bolts 18 and clamp bolts 21 may thus adjust themselves to proper positions relative to the upper and frontal faces of the beam. In other words, the slots being extended lengthwise toward the junction of the plates 11 and 12, the bolts may slip inwardly to accommodate a smaller beam or outwardly to fit a larger beam, as will be understood.

A scraper supporting arm or bar 23 is welded, or otherwise secured, at one end at 24 to the rear, vertical plate 11 of the bracket 10 and, when the bracket is secured to the beam, this arm will extend rearwardly and horizontally. It is this arm 23 which supports the scraper G, and for this purpose the arm is provided with a clamp block or element designated generally at 25. The clamp block is of inverted U-shaped form having the spaced legs 26 set astraddle the arm 23 and the bight 27 joining the legs and bearing on the arm. The legs 26 each have a pair of apertures 28 so located that they will receive a U-bolt 29 extended crosswise of, and beneath, the arm. A stem 30 is secured at 31 to the scraper G and extends upwardly therefrom along one leg 26 of the clamp block 25 which is recessed, as at 32, to receive the stem. The bight 33 of the U-bolt 29 is placed over the stem 30 and, when the nuts 34 on the ends of the bolt are drawn tight, it will be readily understood that the stem will be rigidly locked in place on the clamp block and at the same time the block will be clamped on the arm 23. A single U-bolt thus performs both of the clamping functions.

In use the mounting bracket 10 is applied to and fastened on the beam B in the manner described and is so adjusted on the beam that the arm 23 will stand rearwardly, above and to one side of the concaved face of the disk C. The U-bolt 29 is then loosened and the scraper blade G is adjusted until it stands at the proper position to scrape off the matter accumulated on the disk as it turns. The U-bolt 29 is then drawn tight and the scraper is ready for operation.

The wide bearing afforded by the bracket 10 and spaced bolts thereon, together with the clamping effect exerted on all sides of the beam B serve to positively anchor the bracket on the beam and thus the scraper cannot work out of adjustment as so often occurs with other mounting devices. The scraper mounting may, of course, be employed on other implements, aside from a plow, wherever suitable.

The novel arrangement of the clamp block 25 provides for initial adjustment of the scraper in both horizontal and vertical planes, and together with the adjustment of the bracket 10 along the beam B greatly facilitates the proper positioning of the scraper G reltaive to the disk C. The invention, therefore, provides not only for the most effective adjustment of the scrapers but also ensures that, once set, the scrapers will maintain their adjustment.

While I have herein set forth one preferred embodiment of my invention, it is understood that I may vary from the same in minor structural details so as best to provide a practical device for the purposes intended, provided that such variations fall within the scope of the appended claims.

Having thus fully disclosed my invention, what I claim as new and desire to secure by Letters Patent, is:

1. In combination with a plow disk and beam, a scraper mounting comprising a bracket having integrally joined plates bearing against two faces of the beam, eye bolts adjustably connected with one of the plates, clamp bolts adjustably connected with the other plate and with the eye bolts, the said bolts embracing other sides of the beam and effecting a clamping action on the bracket, and a scraper supported from the said bracket in scraping relation to the disk.

2. In combination with a plow disk and a supporting plow beam, a scraper mounting comprising a bracket of V-shaped form having plates extended at right angles and engaging two adjacent sides of the beam, the said plates having openings adjacent their margins, eye bolts extended through the openings in one of the plates, clamp bolts extended through the eyes in the eye bolts and through the openings in the other plate, nuts on the bolts effective to draw the clamp against the beam, the said bolts engaging other sides of the beam to thereby effect a clamping action entirely around the beam, and a scraper supported from the bracket adjacent to the disk.

3. A plow disk scraper mounting for use upon a plow beam, comprising a bracket of V-shaped form having rigidly connected plates extended at right angles and engaging two adjacent faces of the beam, eye bolts adjustably connected with one of the plates, clamp bolts adjustably connected with the eye bolts and the other plate, the said bolts embracing the exposed faces of the beam and being extended across these faces in spaced relation to each other to thereby effect a clamping action around the beam, and a scraper extended from the bracket.

4. A plow disk scraper mounting for supporting a scraper from a plow beam, the same comprising a bracket adjustably secured to the beam, an arm extended from the bracket, a stem extended from the scraper, a U-shaped clamp member engaging the arm, the legs of the bracket having apertures, one of the said legs having a recess to receive the said stem, a U-bolt passed through the said openings and over the said stem, and nuts on the U-bolt effective to clamp the stem to the clamp member and to clamp the legs of the clamp member on the said arm.

JOHN P. SEAHOLM.